(12) United States Patent
Telang et al.

(10) Patent No.: US 9,785,331 B2
(45) Date of Patent: Oct. 10, 2017

(54) ONE TOUCH SCROLL AND SELECT FOR A TOUCH SCREEN DEVICE

(71) Applicant: SYMBOL TECHNOLOGIES, INC., Schaumburg, IL (US)

(72) Inventors: Trupti Telang, Jersey City, NJ (US); Alexander R Spiro, Astoria, NY (US)

(73) Assignee: Symbol Technologies, LLC, Holtsville, NY (US)

(*) Notice: Subject to any disclaimer, the term of this patent is extended or adjusted under 35 U.S.C. 154(b) by 363 days.

(21) Appl. No.: 14/316,850

(22) Filed: Jun. 27, 2014

(65) Prior Publication Data

US 2015/0378545 A1 Dec. 31, 2015

(51) Int. Cl.
| | |
|---|---|
| *G06F 3/00* | (2006.01) |
| *G06F 3/0485* | (2013.01) |
| *G06F 3/0488* | (2013.01) |
| *G06F 3/0482* | (2013.01) |
| *G09G 5/34* | (2006.01) |
| *G06F 3/01* | (2006.01) |

(52) U.S. Cl.
CPC .......... *G06F 3/0485* (2013.01); *G06F 3/0482* (2013.01); *G06F 3/04883* (2013.01); *G09G 5/34* (2013.01); *G09G 2340/0464* (2013.01); *G09G 2354/00* (2013.01)

(58) Field of Classification Search
CPC ... G06F 3/0485; G06F 3/0482; G06F 3/04883
See application file for complete search history.

(56) References Cited

U.S. PATENT DOCUMENTS

| 5,550,559 | A | 8/1996 | Isensee et al. |
| 7,587,683 | B2* | 9/2009 | Ito ........................ G06F 3/04817 |
| | | | 455/566 |
| 2003/0043207 | A1 | 3/2003 | Duarte |
| 2007/0168413 | A1* | 7/2007 | Barletta .............. G06F 3/04883 |
| | | | 709/203 |
| 2011/0087997 | A1 | 4/2011 | Lee et al. |
| 2012/0313977 | A1 | 12/2012 | Kwon |

(Continued)

FOREIGN PATENT DOCUMENTS

| AU | 2010304099 A1 | 4/2012 |
| WO | 2005104709 A2 | 11/2005 |

*Primary Examiner* — Nicholas Augustine

(57) ABSTRACT

A technique for controlling a touch screen device to select an element from a first list using a second list of numbers assigned to each element in the first list.

When displayed next to each other, the first and second lists have different respective spacings between their elements. The spacing used in the second list is scaled so all the numbers therein can fit on the display. In operation, the display is touched at an initial touch point. Dragging the finger up the display will pull up the second list at the touch point, while simultaneously pulling up the first list next to it. However, since the spacing is different for each list, the first list can scroll faster and farther than the second list. The entire second list can fit on the display, but the first list scrolls beyond the display limits. The element corresponding to the number under the touch point is highlighted. Thereafter, releasing the touch point in the first list will select the highlighted element in the second list, which is actually elsewhere on the display from the touch point.

20 Claims, 5 Drawing Sheets

(56) References Cited

U.S. PATENT DOCUMENTS

| | | | |
|---|---|---|---|
| 2013/0222435 A1* | 8/2013 | Choi | G06F 3/0482 345/684 |
| 2013/0246970 A1 | 9/2013 | Helle | |
| 2015/0143282 A1* | 5/2015 | Telang | G06F 3/0487 715/784 |

* cited by examiner

ONE TOUCH SCROLL AND SELECT FOR A TOUCH SCREEN DEVICE

BACKGROUND

Touch-sensitive displays (also known as "touch screens") are well known in the art. Touch screens are used in many electronic devices to display control buttons, graphics, text, and to provide a user interface through which a user may interact with the device. A touch screen detects and responds to one or more contacts on its surface. A device may display one or more control buttons, soft keys, menus, and other user-interface elements on the touch screen. A user may interact with the device by contacting the touch screen at locations corresponding to the user-interface (UI) elements with which they wish to interact.

One problem associated with using touch screens on portable devices is quickly and easily finding a desired user-interface element to launch the desired functionality. Considering the rich functionalities the application can provide, there may be lots of UI elements (e.g. buttons, knobs, controls, and the like) on a display. A major problem is that it may be troublesome for user to find the right UI element in a timely manner, especially in a mission critical situation. For example, a user may be required to make a selection from a large number of items that cannot be displayed as a complete list on the display, due to size or other constraints. This requires the user to scroll through the list in order to make the selection. The scrolling itself consists of several repeated dragging, sliding, and flicking gestures, which makes the whole process of selection time consuming, frustrating, and unpleasant. This is particularly troublesome in cases of public safety or other emergency where time is of essence.

Therefore, a need exists for a method and apparatus for controlling a touch-screen device that makes controlling the device easier and more time-efficient.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
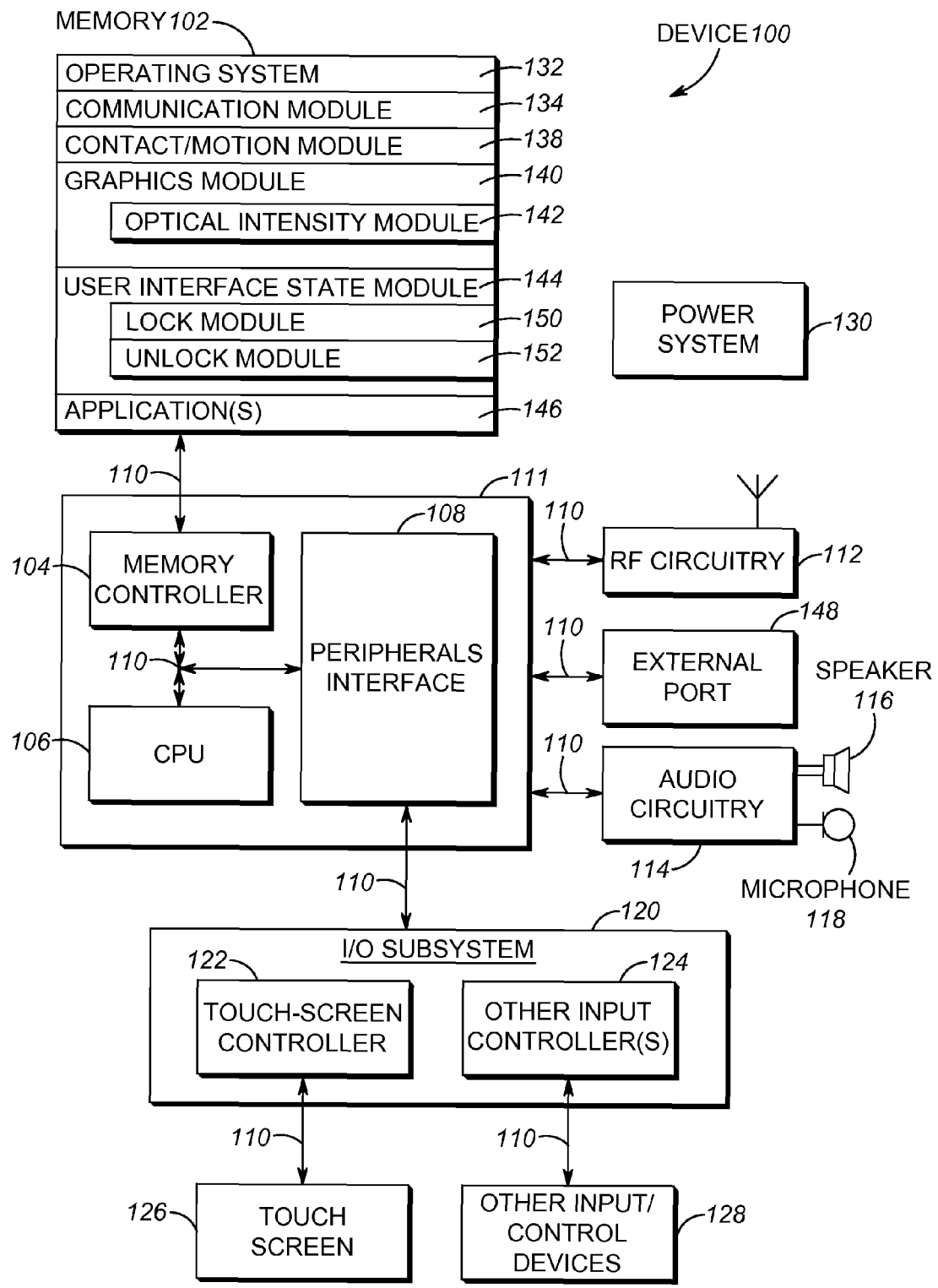
FIG. 1 is a simplified block diagram of an apparatus, in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention describes a technique by which a user will be able to scroll through an entire list of elements on a touch screen in a single sliding touch gesture. At present, when a user scrolls though items on a list, the movement of the list is coupled or anchored to the touch point. In other words, wherever a user touches and scrolls on the screen, the element under the touch point remains anchored with the touch point wherever the touch moves, until it is released, i.e. the element is dragged along with the touch point until it is released. In contrast, the present invention decouples the touch point from actual element positions on the screen, but instead scales the entire list of elements to a maximum display length on the touch screen. For example, if an entire list hypothetically would take the equivalent of eight inches to display but the display is only four inches long, a user may move their finger the four inches along the touch screen and the elements being scrolled will move the equivalent of eight inches. In effect, the present invention accelerates the scrolling of a list by scaling the motion of the all the elements in the list relative to an actual length of a single finger movement across a display.

After scrolling, the user can simply release their touch to select a particular element of that list. For example, individual items from the list can be highlighted and/or magnified, for a user to focus on, as they scroll through the entire list with one sliding touch gesture. Releasing the touch will select the function of the item that is highlighted/magnified at the time that the touch is released. The device will interpret the user's release and launch the selected associated functionality. As a result, the present invention provides that a functional item from a large list can be scrolled and selected with one sliding touch gesture, making the selection of that item faster and easier.

Referring to FIG. 1, there is shown a block diagram of a system adapted to support the inventive concepts of the preferred embodiments of the present invention. Those skilled in the art will recognize that FIG. 1 does not depict all of the equipment necessary for system to operate but only those system components and logical entities particularly relevant to the description of embodiments herein. Further, the equipment shown includes many communication components that are not shown for the sake of simplicity. In general, components such as processors, memories, wired and wireless transceivers, and the like, are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement processors that perform the given logic. Therefore, the devices shown represent a known apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the AP aspect of the present invention may be implemented in any of the devices listed above or distributed across such components. It is within the contemplation of the invention that the operating requirements of the present invention can be implemented in software, firmware or hardware, with the function being implemented in a software processor (or a digital signal processor) being merely a preferred option.

Turning now to the drawings, where like numerals designate like components, FIG. 1 is a block diagram of a portable electronic device 100 that preferably comprises a touch screen 126. The device 100 includes a memory 102, a memory controller 104, one or more central processing unit (CPU) 106, a peripherals interface 108, RF circuitry 112, audio circuitry 114, a speaker 116, a microphone 118, an input/output (I/O) subsystem 120, the touch screen 126, other input or control devices 128, and an external port 148. These components communicate over the one or more communication buses or signal lines 110. The device 100 can be any portable electronic device, including but not limited to a handheld computer, a tablet computer, a mobile phone, a police radio, a media player, a personal digital assistant, or the like, including a combination of two or more of these items. It should be appreciated that the device 100 is only one example of a portable electronic device, and that the device may have more or fewer components than shown, or a different configuration of components.

The memory 102 may include high speed random access memory and may also include non-volatile memory, such as one or more magnetic disk storage devices, flash memory devices, or other non-volatile solid state memory devices. In some embodiments, the memory 102 may further include storage remotely located from the one or more processors 106, for instance network attached storage accessed via the RF circuitry 112 or external port 148 and a communications network (not shown) such as the Internet, intranet(s), Local Area Networks (LANs), Wide Local Area Networks (WLANs), Storage Area Networks (SANs) and the like, or any suitable combination thereof. Access to the memory 102 by other components of the device 100, such as the CPU 106 and the peripherals interface 108, may be controlled by the memory controller 104.

The peripherals interface 108 couples the input and output peripherals of the device to the CPU 106 and the memory 102. The one or more processors 106 run various software programs and/or sets of instructions stored in the memory 102 to perform various functions for the device 100 and to process data.

The I/O subsystem 120 provides the interface between input/output peripherals on the device 100, such as the touch screen 126 and other input/control devices 128, and the peripherals interface 108. The I/O subsystem 120 includes a touch-screen controller 122 and one or more input controllers 124 for other input or control devices. The one or more input controllers 124 receive/send electrical signals from/to other input or control devices 128. The other input/control devices 128 may include physical buttons (e.g., controls, push buttons, rocker buttons, etc.), dials, slider switches, sticks, and so forth.

The touch screen 126 provides both an output interface and an input interface between the device and a user. The touch-screen controller 122 receives/sends electrical signals from/to the touch screen 126. The touch screen 126 displays visual output to the user. The visual output may include text, graphics, video, and any combination thereof.

The touch screen 126 also accepts input from the user based on haptic, tactile, and/or electrical contact. The touch screen 126 forms a touch-sensitive surface that accepts user input. The CPU 106, touch screen 126, and the touch screen controller 122 (along with any associated modules and/or sets of instructions in the memory 102) detects contact (and any movement or break of the contact) on the touch screen 126 and converts the detected contact into an action, such as the actuation of one or more user-interface elements (e.g., soft keys), or other actions such as, but not limited to, scroll elements up/down.

In an exemplary embodiment, a point of contact between the touch screen 126 and the user corresponds to one or more digits of the user. The touch screen 126 may use liquid crystal display technology or light emitting polymer display technology, although other display technologies may be used, as are known in the art, in other embodiments. The touch screen 126 and touch screen controller 122 may detect contact and any movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 126. Although the text herein describes contact with touch screen 126 with a user's fingers, a user may make contact with the touch screen 126 using any suitable object or appendage, such as a stylus, finger, and so forth.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 126 or an extension of the touch-sensitive surface formed by the touch screen 126.

In some embodiments, the software components include an operating system 132, a communication module (or set of instructions) 134, an electronic contact module (or set of instructions) 138, a graphics module (or set of instructions) 140, a user interface state module (or set of instructions) 144, and one or more applications (or set of instructions) 146.

A contact/motion module 138 detects contact with the touch screen 126, in conjunction with the touch-screen controller 122. The contact/motion module 138 includes various software components for performing various operations related to detection of contact with the touch screen 126, such as determining if contact has occurred, determining a type of contact (e.g., tap, touch and hold, swipe, pinch, etc.) determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (including magnitude and/or direction) of the point of contact. In some embodiments, the contact/motion module 138 and the touch screen controller 122 also detects contact on the touchpad.

The graphics module 140 includes various known software components for rendering and displaying graphics on the touch screen 126. Note that the term "graphics" includes any object that can be displayed to a user, including without limitation text, web pages, icons (such as user-interface objects including soft keys), digital images, videos, animations and the like.

In some embodiments, the graphics module 140 includes an optical intensity module 142. The optical intensity module 142 controls the optical intensity of graphical objects, such as user-interface objects, displayed on the touch screen 126. Controlling the optical intensity may include increasing or decreasing the optical intensity of a graphical object. In some embodiments, the increase or decrease may follow predefined functions.

In some embodiments, the device 100 is a device where operation of a predefined set of functions on the device is performed exclusively through the touch screen 126 and, if included on the device 100, the touchpad. By using the touch screen and touchpad as the primary input/control device for operation of the device 100, the number of physical input/control devices (such as push buttons, dials, and the like) on the device 100 may be reduced.

As described above, one problem associated with using touch screens 126 on portable devices is quickly and easily controlling the device 100. In particular it may be troublesome for user to find the right UI element to execute a desired function in a timely manner, especially in a mission critical situation. In order to address this need, contact/motion module 138 will detect a user's current finger position and movement on touch screen 126. Then contact/motion module 138 will provide this information to CPU 106, which will then execute an assigned task. The above technique makes it much easier and more time-efficient for a user to select from a long list of executable tasks on the device 100, as will be described in detail below.

Figure 2:
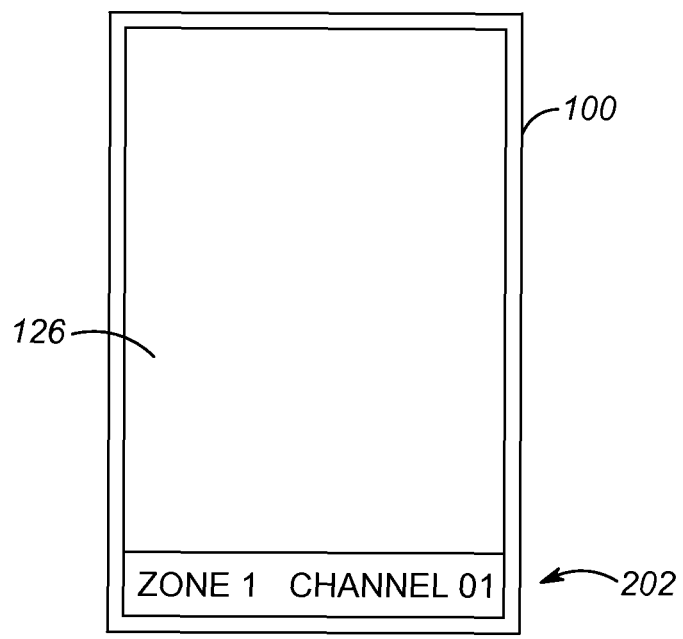
FIG. 2 is a frontal view of the apparatus of FIG. 1.

As shown in FIG. 2, the device 100 incorporates a touch screen 126. The touch screen provides a graphical user interface for interaction with a user. The graphical user interface can display selectable operating parameters of the device for the user to choose. In this example, two parameters are shown, an operating geographic zone of the device, which can be displayed as a geographic map on the display of the device, and an operating frequency channel of the device, where these parameters are shown in a drag bar at the lower edge of the touch screen for example. It should be recognized that any number of selectable operating parameters can be shown in various locations on the display, and not necessarily on a drag bar. In this example, only two parameters are shown for the sake of simplicity of the example. In this case, the device is presently using operating Channel 01 in Zone 1.

Normally, if a user wants to select a different operational function of a device, and there is a long list of functions to choose from, then in order to present this long list of items to a user in an easily readable fashion, the device will present these functions in a scrollable list. In this example, if it is assumed that there are fourteen different zones to choose from. In order to present all fourteen zones names to a user in the display, the names would need to be spaced very close together using a very small font, making reading of the name difficult, and making the accurate selection of a function difficult, particularly if a user's finger could simultaneously cover two or more names. Therefore, scrolling becomes necessary. The present invention controls such scrolling in a unique way.

In the present invention, the CPU 106 controls all the operational parameters of the device. Knowing the selectable options for each parameter, the CPU can compile a list of selectable elements for each parameter. For example, the device may have twenty different frequency channels it can operate on. The device having a predetermined length of a display of the touch screen, the CPU understands that not all twenty channels can be displayed on the device easily at one time, and that scrolling is required. In accordance with the present invention, the CPU will also associate another list of cardinal numbers with each channel element. In this case, the consecutive numbers 1 through 20 can each be assigned to one of the available twenty channels. This second list of numbers will be displayed alongside the list of channel elements. However, in the present invention the size of the list of numbers is scaled such that the entire list of numbers can be displayed on the touch screen, while the list of channel elements is not scaled, such that only a portion of the channel elements can be shown on the display at any one time.

In practice, the different scales are achieved by the CPU by establishing for the first list of channel elements a first font size and spacing to be used between the elements in the first list when displaying the first list of elements on the display, and establishing for the second list of associated cardinal numbers a second font size and spacing to be used between the numbers in the second list when displaying the second list of numbers on the display. In accordance with the present invention, the first and second spacings are different, wherein the second spacing is scaled such that all the numbers in the second list can be displayed on the predetermined length of the display, and where only part of the first list can ever be displayed along the predetermined length of the display, as will be detailed below.

Figure 3:
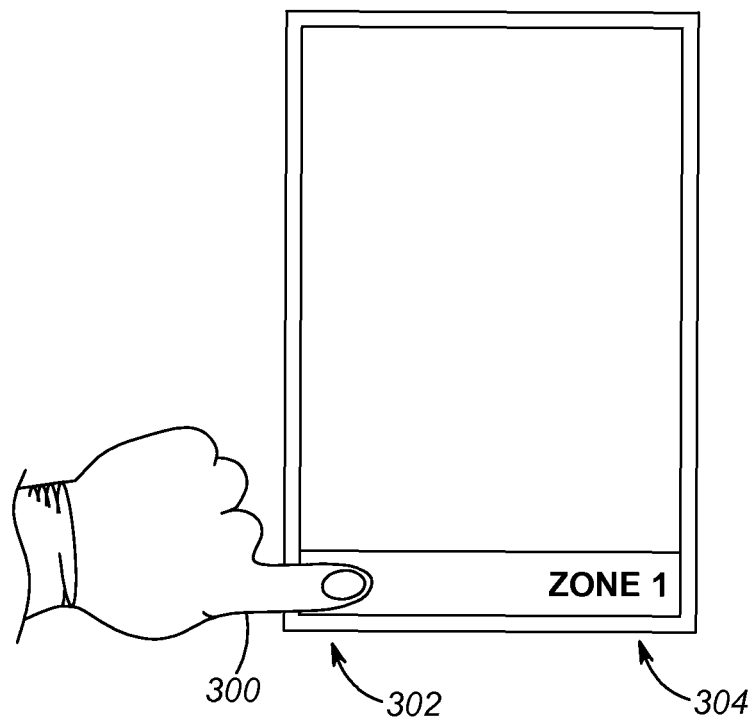
FIG. 3 is a frontal view of the apparatus of FIG. 2, with a user touching the touch screen to initiate element selection, in accordance with one embodiment of the present invention.

Referring to FIG. 3, in another example presented herein, the user wishes to change the operating zone parameter of the device. However, it should be recognized that the present invention is applicable to changing any operating parameter of the device, e.g. channel, etc. In order to change the zone, the user will touch the fingertip 300 of their hand on the touch screen onto the parameter or element they wish to change—in this case "Zone 1" in the drag bar at position 302. This initial touch point is detected by the contact/motion module and initiates a first touch event for displaying zone elements in a first list by the graphics module. A touch event is detected by the contact/motion module when a pointing apparatus, such as a user's fingertip or a stylus, is making physical contact with, disengages from, or slides along the touch screen.

During operation, contact/motion module 138 will detect a user's current finger location on the touch screen 126 and a type of touch event, which is provided to the CPU 106. In this example, the first touch event is a touch-and-hold where the user's finger touches and remains in contact with the touch screen 126 located over the "Zone" icon. The CPU 106 will then determine that a touch- and hold event has occurred, and a first command will then be executed by the CPU based on this first touch event. In this example, the CPU will recall the first and second lists from the memory for the "Zone" operational elements, and direct the graphics module to highlight the selected element at a particular location 304, which is the drag bar in this example. The other operating parameter(s), such as channels for example, could also remain displayed (not shown). Highlighting could be manifested by the graphics module in various ways including magnifying (as shown), underlining, bold text (as shown), font change, color change, background change, and the like.

In order to determine a relative location of each touch event, the contact/motion module 138 can define the lower upper corner of the layout as the origin point and the upward direction is the positive direction for the vertical coordinate, y. Corresponding touch events located at the bottom portion of screen 126 will have a lower y value while touch events located at the upper portion of screen 126 will have a higher y value. In a similar manner, the x coordinate can be used to define touch events having a left to right horizontal position. These coordinates are referred to the CPU to indicate which element the user is touching.

Upon the first touch point, and in accordance with a first embodiment, the CPU will direct graphics module 140 to display the first entry of each of the first and second lists in the drag bar. In this case, the cardinal number "1" is shown in position 302 (but it is not seen since it is covered by the user's finger) and the first entry "Zone 1" is shown in position 304 since it is the first entry in the zone element list. The zone element showing in the drag bar can be highlighted as previously discussed. The CPU, depending of touch position (see FIGS. 3-5), will direct the graphics module to show a portion of the second list starting at the initial touch point and the remainder of the portion of the list displayed along the predetermined length from the initial touch point using the second spacing between numbers, and displaying next to the portion of the second list a portion of the first list using the first spacing between elements.

Figure 4:
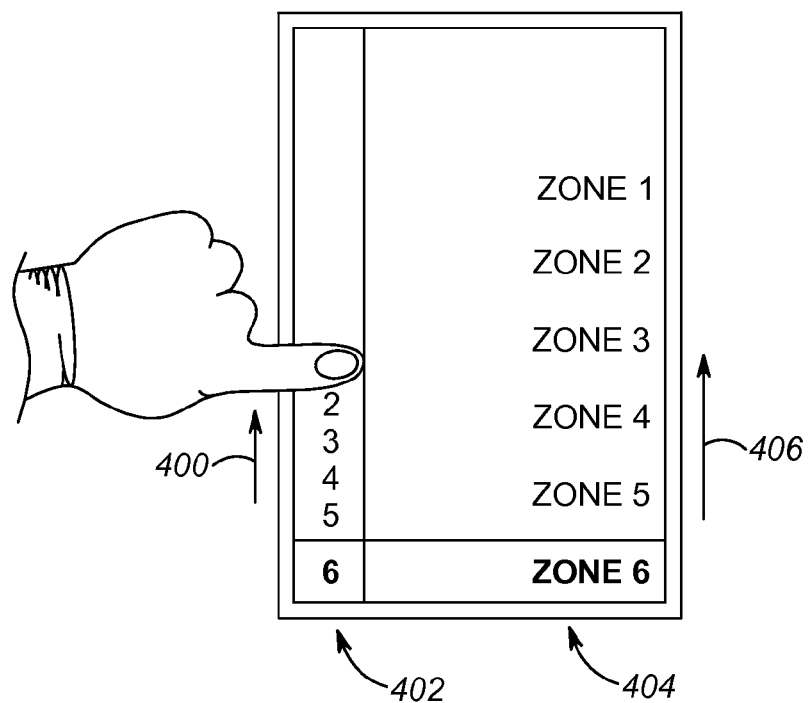
FIGS. 4-5 are frontal views of the apparatus of FIG. 3, with a user sliding their finger on the touch screen to scroll elements, in accordance with the one embodiment of the present invention.

Referring to FIG. 4, a second touch event detected by the contact/motion module is the dragging or sliding of the user's finger along the predetermined length of the display, which is used by the CPU to direct the graphics module to display further elements of the second list. The contact/motion module 138 detects the location of the sliding contact and the CPU 106 is notified. CPU 106 then determines a relative position of the sliding touch event. When the CPU 106 receives the sliding second touch event, the CPU 106 determines a location of the sliding touch and determines the relative position difference of the sliding touch relative to the first touch event. Dividing this difference by the second spacing of the second number list, the CPU can determine how many numbers of the cardinal list to display. The same number of zone elements from the first list is also displayed. Therefore, as the touch point moves, both the first and second lists will scroll. However, since the first spacing between the zone elements is larger than the second spacing of the cardinal number list, the first list of zone elements appears to scroll much faster 402 than the touch point motion 400, i.e. the elements in the zone list are moved along the length of the display at a rate different, and greater, than a motion of the touch point. In this embodiment, the displayed portion of the cardinal list starts with the first number being dragged and displayed at the sliding touch point and the remainder of the portion of the cardinal list displayed along the predetermined length from the first number to the drag bar. The first list of zone elements moves at a different rate than the touch point, and the element of the first list associated with the number of the second list are displayed together in the drag bar.

Figure 5:
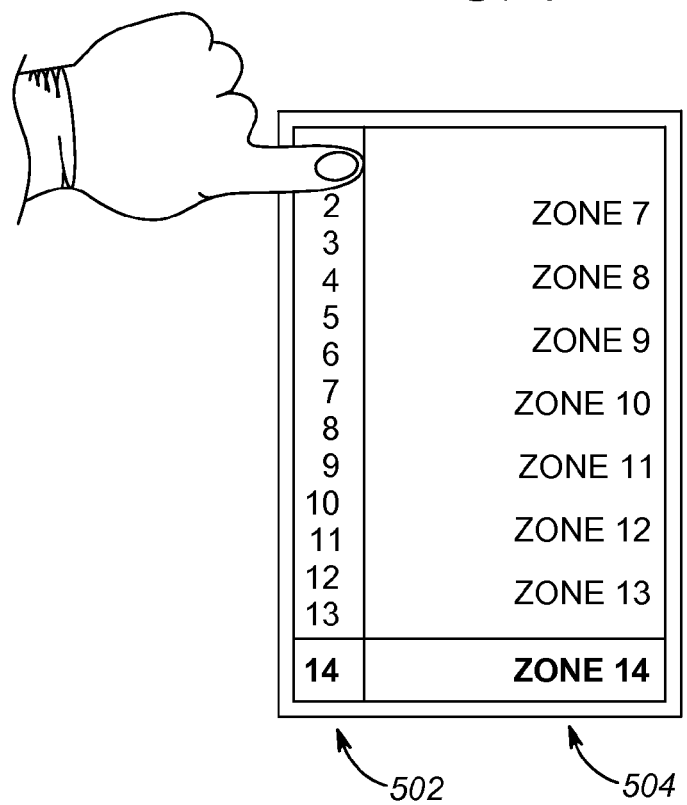

As shown in FIG. 5, as the user moves the touch point though the entire predetermined length of the display, eventually the entire cardinal number list of fourteen numbers is revealed. However, since the spacing of the zone elements is greater than the spacing of the cardinal number list the entire list of zone elements cannot be shown. In particular, the zone elements have scrolled well past the first zone to only show the last zone elements 7-14.

The third touch event detected by the contact/motion module is the user releasing the touch point to select the highlighted element in the zone element list. For example, in FIG. 4, the user releasing their finger would cause Zone 6 to be selected by the CPU, and in FIG. 5, the user releasing their finger would cause Zone 14 to be selected. It should be noted that the selected zone element in the drag bar is not related to the touch point. The selected element is not coupled to the touch point since it is elsewhere on the display from the touch point. Once a Zone is selected the CPU can execute a function associated with the selected element. For example, where the first list includes zone elements of a map, the function includes displaying the selected zone of the map. In the other example where the first list includes operating channels of the device, the function includes switching of the device to a selected operating channel.

Normally, in prior art touch screen systems, the icon where a user's finger is resting is the icon function being selected by the user. However, the present invention provides indirect selection, where the touch point is elsewhere from the icon being selected. In some embodiments, the place where an icon is selected remains same (i.e. the drag bar) even though the touch point moves. Although the present invention has been explained using the example of lists of operable parameters of a device, it should be realized that the present invention is equally applicable to reading lines of a receipt, notes, or a book, where the user can scroll through content with the lines in the highlight area being magnified.

The present invention dynamically spaces the anchor points of the list of cardinal numbers, depending on the size of the list, in order to be able to fit the complete list on the display. The anchor points are shown on the left side of the display in the examples herein, so as a user scrolls the list the anchor points keep accumulating, as shown in FIGS. 4-5, ultimately allowing the display of all the numbers of the cardinal list. Having the entire list showing also provides the ability to jump to specific list element or a specific section directly if it is decided to allow this. Since the anchor points are shown, a user jumping in the list would have a much better idea of where to tap to get a particular element (rather than estimating where to tap).

Therefore, in one embodiment of the present invention, the physical location of the highlighted selectable element remains in the same location 304, 404, 504 during scrolling, so a user does not need to change their focus of attention during the entirety of scrolling, i.e. the user only needs to look at the drag bar when scrolling in order to stop at the element to be selected.

Figure 6:
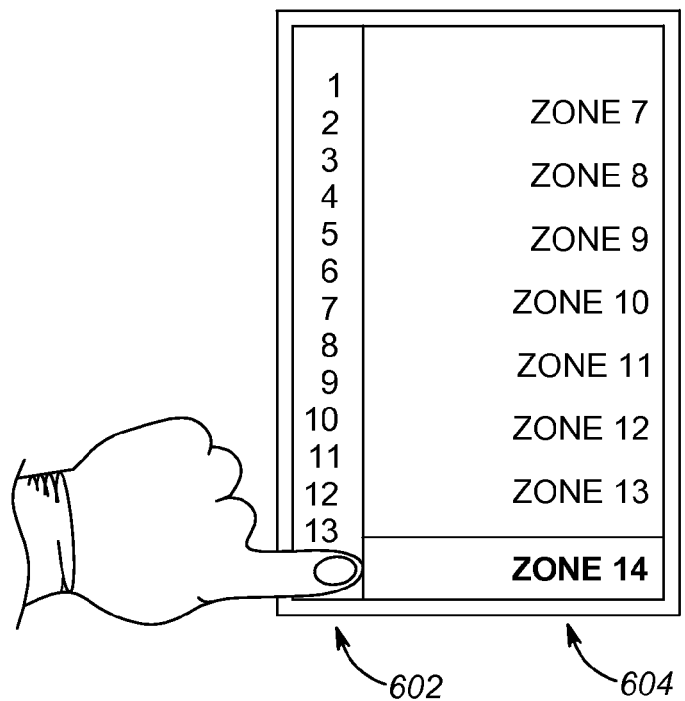
FIG. 6 is a frontal view of the apparatus of FIG. 2, with a user touching the touch screen to initiate element selection, in accordance with another embodiment of the present invention.

In accordance with another embodiment, upon the first touch point of FIG. 6, the CPU will direct graphics module 140 to display the entire list of cardinal numbers and the associated partial list of zone elements along the predetermined length. Again, the cardinal number and its associated zone element are highlighted, except in this case the drag bar moves along with the touch point. In this case, the cardinal number "14" is shown in position 602 (but it is not seen since it is covered by the user's finger) and the last entry "Zone 14" is shown in position 604 since it is the corresponding last entry in the zone element list. The CPU, depending on touch position (see FIGS. 6-7), will direct the graphics module to show a portion of the second list starting at the initial touch point and the remainder of the portion of the list displayed along the predetermined length from the initial touch point using the second spacing between numbers, and displaying next to the portion of the second list a portion of the first list using the first spacing between elements.

Figure 7:
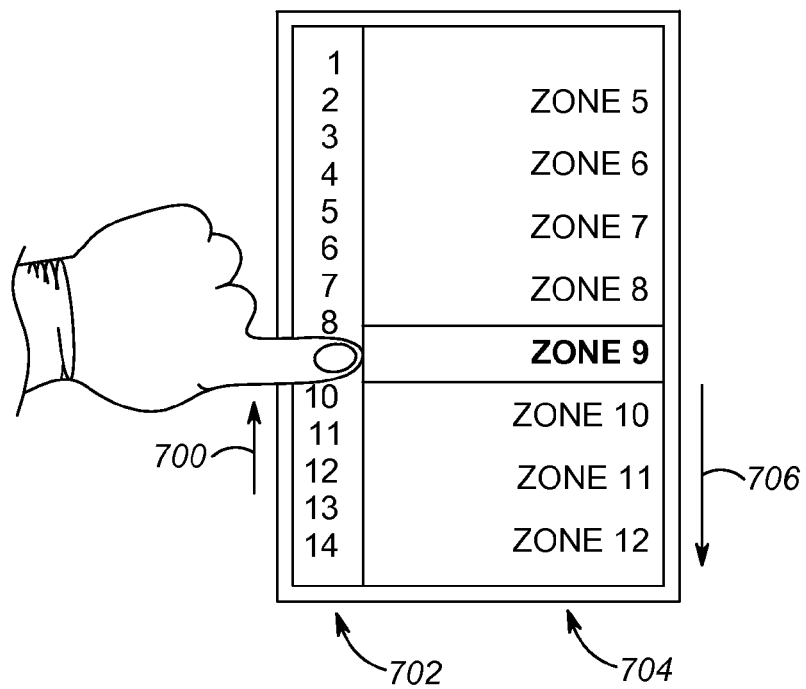
FIG. 7 is a frontal view of the apparatus of FIG. 6, with a user sliding their finger on the touch screen to scroll elements, in accordance with another embodiment of the present invention.

Referring to FIG. 7, a second touch event is dragging or sliding the user's finger along the predetermined length of the display along the fixed elements of the cardinal list. The contact/motion module 138 detects the location of the sliding contact and the CPU 106 is notified. CPU 106 then determines a relative position of the sliding touch event. When the CPU 106 receives the sliding second touch event, the CPU 106 determines a location of the sliding touch and determines the relative position difference of the sliding touch relative to the first touch event. Dividing this difference by the second spacing of the second number list, the CPU can determine over how many numbers of the cardinal list the touch point has moved. The same number of zone elements from the first list is also displayed. However, as the touch point moves, only the first list of zone elements will scroll. Since the first spacing between the zone elements is larger than the second spacing of the cardinal number list, the first list of zone elements appears to scroll much faster, but in an inverse relation 702, than the touch point motion 700, i.e. the elements in the zone list are moved along the length of the display at a rate different, and greater than, a motion of the touch point. In this embodiment, the first list of zone elements moves at a different rate, and opposite, than the touch point, and the element of the first list associated with the number of the second list under the touch point are highlighted together in the moving drag bar.

Since the spacing of the zone elements is greater than the spacing of the cardinal number list the entire list of zone elements cannot be shown. Therefore, as shown in FIG. 7, as the user moves the touch point through the entire predetermined length of the display, the list of zone elements will scroll downwardly such that the zone element of the first list corresponding to its cardinal number in the second list are always adjacent to each other.

As before, the third touch event is the user releasing the touch point to select the highlighted element in the zone element list. For example, in FIG. 6, the user releasing their finger would cause Zone 14 to be selected, and in FIG. 7, the user releasing their finger would cause Zone 9 to be selected. It should be noted that the selected zone element in the drag bar is not the same as the touch point. The selected element is not directly coupled to the touch point since it is elsewhere on the display from the touch point. Once a Zone is selected the CPU can execute a function associated with the selected element. For example, where the first list includes zone elements of a map, the function includes displaying the selected zone of the map. In the other example, where the first list includes operating channels of the device, the function includes switching of the device to a selected operating channel.

Optionally, the present invention provides further functionality by providing for multiple selection and sub-list selection. In particular, for multiple selection, the present invention allows combining a gesture (slight horizontal drag out and back to the touch point) while the user is scrolling in order to check an item, thus allowing for the temporary selection of multiple elements, all in one touch, without lifting a finger off of the touch screen. For example, if the user in FIG. 4 would move their finger slightly to the right and back at the moment shown, this could serve to checkmark Zone 6, which can then be highlighted as it moves upscreen, indicating that it is checked. Then, if that user would move their finger slightly to the right and back at the moment shown in FIG. 5, this could serve to checkmark Zone 14 also, which can then be highlighted, indicating that it is checked. Releasing the touch would then select both Zone 6 and 14. Further, if the user in FIG. 4 would move their finger slightly to the left and back at the moment shown, this could serve to uncheck Zone 6 (if it was previously checked), which results in removing its highlight, indicating that it is unchecked. Then, if that user would move their finger slightly to the left and back at the moment shown in FIG. 5, this could serve to uncheck Zone 14 also, which results in removing its highlight, indicating that it is unchecked.

For sub-list selection, the present invention allows combining a gesture (slight horizontal drag out and back to the touch point) while the user is scrolling in order to call up any sub-lists or sub-menus involving the highlighted item, all in one touch, without lifting a finger off of the touch screen. For example, if the user in FIG. 4 would move their finger slightly to the right, for example, at the moment shown, this could serve to bring up a display of sub-areas of Zone 6 in an additional list. The additional list could then be scrolled using a second highlighted drag bar to select the appropriate sub-area item in the third list by moving their finger back to the left when the appropriate sub-area is highlighted. Alternatively, releasing the touch could be used for selecting both the sub-area and zone, such as sub-area alpha of Zone 6, for example. It is envisioned that any other gesture or movement direction could be used to code for pulling up or collapsing the additional list, or for moving back higher in the hierarchy (main) list. For example, moving the finger slightly to the right can call up the additional list, and moving the finger back to the left slightly can collapse the additional list and return to the main list.

Figure 8:
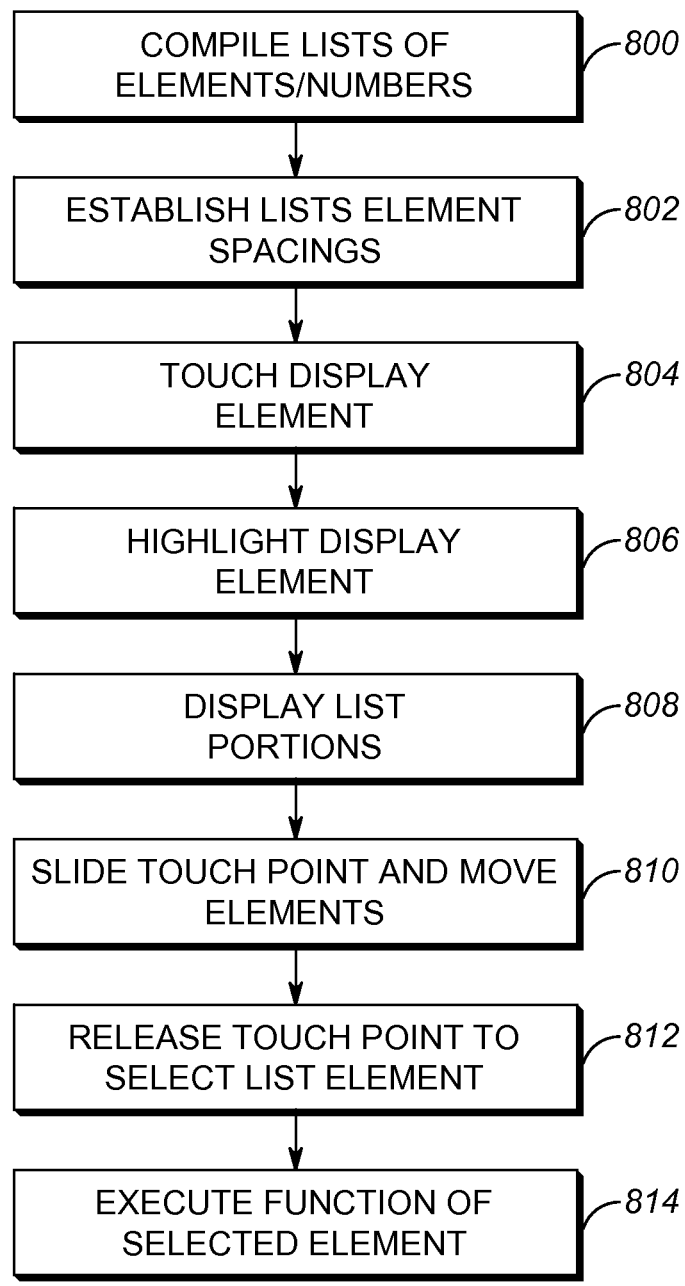
FIG. 8 illustrates a flow chart of a method, in accordance with some embodiments of the present invention.

FIG. 8 is a flowchart illustrating a method for controlling a touch screen device. As illustrated, the method begins with compiling 800 a first list of selectable elements to present on a predetermined length of a display of a touch screen device and a second list of numbers assigned to each element in the first list.

A next step includes establishing 802 for the first list of elements a first spacing to be used between the elements in the first list when displaying the first list of elements on the display, and establishing for the second list of numbers a second spacing to be used between the numbers in the second list when displaying the second list of numbers on the display, wherein the first and second spacings are different, and wherein the second spacing is scaled such that all the numbers in the second list can be displayed on the predetermined length of the display.

A next step includes touching 804 the display at an initial touch point for displaying the elements in the first list.

A next step includes highlighting 806 the element of the first list associated with the number of the second list being touched at the touch point. The highlighted element can be presented at a defined area of the display, such as a drag bar located at one end of the predetermined length.

A next step includes displaying 808 a portion of the second list starting at the initial touch point and the remainder of the portion of the list displayed along the predetermined length from the initial touch point using the second spacing between numbers, and displaying next to the portion of the second list a portion of the first list using the first spacing between elements. In an alternate embodiment, this step includes displaying the entire cardinal second list along the predetermined length.

A next step includes sliding 810 the touch point along the predetermined length to display further elements of the second list, wherein the elements are moved along the length of the display at a rate different than a motion of the touch point. In particular, this step includes displaying a portion of the second list starting with the first number being dragged and displayed at the sliding touch point and the remainder of the portion of the cardinal list displayed along the predetermined length from the first number to the drag bar, and wherein the first list moves at a different rate than the touch point and displays the element of the first list associated with the number of the second list in the drag bar. In the alternate embodiment, this step includes the second list not moving while the touch point moves, i.e. the finger moves over the fixed list, and where the first list moves at a different rate than the touch point. In either of these embodiments, the first list moves at a greater rate than the touch point.

A next step includes releasing 812 the touch point to select the highlighted element in the second list that is elsewhere on the display from the touch point.

A next step includes executing 814 in the device a function associated with the selected element. For example, where the first list includes zone elements of a map, the function includes displaying a selected zone of the map, and where the first list includes operating channels of the device, the function includes switching of the device to a selected operating channel.

Advantageously, the present invention combines the action/interaction of scrolling and selection, and makes it available with the use of a single gesture, thereby making control of a device easier and more time-efficient.

Those skilled in the art will recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus for controlling a touch-screen device, comprising:
a processor operable to:
compile a first list of selectable elements to present on a predetermined length of a display of the touch screen device and a second list of numbers, wherein each number in the second list is assigned to a corresponding element in the first list, and
establish for the first list of elements a first spacing to be used between the elements in the first list when displaying the first list of elements on the display, and establish for the second list of numbers a second spacing to be used between the numbers in the second list when displaying the second list of numbers on the display, wherein the first and second spacings are different, and wherein the second spacing is scaled such that all the numbers in the second list can be displayed on the predetermined length of the display;
a contact/motion module coupled to the processor and operable to detect a touch on the display at an initial touch point, a sliding of the touch point along the predetermined length, and a release of the touch point;
a graphics module operable under direction of the processor and operable to display a portion of the second list starting at the initial touch point and the remainder of the portion of the second list displayed along the predetermined length from the initial touch point using the second spacing between numbers, and to display next to the portion of the second list a portion of the first list using the first spacing between elements, and upon the sliding of the touch point along the predetermined length the graphics module displays further elements of the second list, wherein the elements are moved along the length of the display at a rate different than a motion of the touch point; and
the processor further operable to select an element in the second list and a corresponding element in the first list, wherein the selected elements are disposed elsewhere on the display from the touch point when the contact/motion module detects the release of the touch point.

2. The apparatus of claim 1, wherein the graphics module is further operable to highlight the element of the first list associated with the number of the second list being touched at the touch point, and when the contact/motion module detects the release of the touch point, the processor selects the highlighted element.

3. The apparatus of claim 2, wherein the highlighted element is presented at a defined area of the display by the graphics module.

4. The apparatus of claim 3, wherein the defined area is drag bar located at one end of the predetermined length, and when the contact/motion module detects sliding of the touch point, the graphics module displays a portion of the second list starting with the first number being dragged and displayed at the sliding touch point and the remainder of the portion of the second list being displayed along the predetermined length from the first number to the drag bar, and wherein the graphics module moves the first list at a different rate than the touch point and displays the element of the first list associated with the number of the second list in the drag bar.

5. The apparatus of claim 2, wherein the graphics module displays the entire second list along the predetermined length, and when the touch point slides the first list moves at a different rate than the touch point.

6. The apparatus of claim 1, wherein the processor executes in the device a function associated with the selected element.

7. The apparatus of claim 6, wherein the first list includes zone elements of a map and the function includes displaying a selected zone of the map.

8. The apparatus of claim 6, wherein the first list includes operating channels of the device and the function includes switching of the device to a selected operating channel.

9. The apparatus of claim 1, wherein when the contact/motion module detects the touch point sliding, the graphics module moves the first list at a greater rate than the touch point.

10. A method for controlling a touch screen device, the method comprising:
compiling a first list of selectable elements to present on a predetermined length of a display of the touch screen device and a second list of numbers, wherein each number in the second list is assigned to a corresponding element in the first list;
establishing for the first list of elements a first spacing to be used between the elements in the first list when displaying the first list of elements on the display, and establishing for the second list of numbers a second spacing to be used between the numbers in the second list when displaying the second list of numbers on the display, wherein the first and second spacings are different, and wherein the second spacing is scaled such that all the numbers in the second list can be displayed on the predetermined length of the display;
receiving touch input at the display at an initial touch point for displaying the elements in the first list;
displaying a portion of the second list starting at the initial touch point and the remainder of the portion of the second list displayed along the predetermined length from the initial touch point using the second spacing between numbers, and displaying next to the portion of the second list a portion of the first list using the first spacing between elements;
sliding the touch point along the predetermined length to display further elements of the second list, wherein the elements are moved along the length of the display at a rate different than a motion of the touch point; and
releasing the touch point to select an element in the second list and a corresponding element in the first list, wherein the selected elements are disposed elsewhere on the display from the touch point.

11. The method of claim 10, further comprising highlighting the element of the first list associated with the number of the second list being touched at the touch point, and wherein releasing includes selecting the highlighted element.

12. The method of claim 11, wherein the highlighted element is presented at a defined area of the display.

13. The method of claim 12, wherein the defined area is drag bar located at one end of the predetermined length, and wherein sliding includes displaying a portion of the second list starting with the first number being dragged and displayed at the sliding touch point and the remainder of the portion of the second list displayed along the predetermined length from the first number to the drag bar, and wherein the first list moves at a different rate than the touch point and displays the element of the first list associated with the number of the second list in the drag bar.

14. The method of claim 11, wherein displaying includes displaying the entire second list along the predetermined length, and wherein in the sliding step the first list moves at a different rate than the touch point.

15. The method of claim 10, further comprising executing in the device a function associated with the selected element.

16. The method of claim 15, wherein the first list includes zone elements of a map and the function includes displaying a selected zone of the map.

17. The method of claim 15, wherein the first list includes operating channels of the device and the function includes switching of the device to a selected operating channel.

18. The method of claim 10, wherein during sliding the first list moves at a greater rate than the touch point.

19. A method for controlling a touch screen device, the method comprising:

compiling a first list of selectable elements to present on a predetermined length of a display of the touch screen device and a second list of selectable elements, wherein each element in the second list is assigned to a corresponding element in the first list;

establishing for the first list of elements a first spacing to be used between the elements in the first list when displaying the first list of elements on the display, and establishing for the second list of elements a second spacing to be used between the elements in the second list when displaying the second list of elements on the display, wherein the first and second spacings are different, and wherein the second spacing is scaled such that all the elements in the second list can be displayed on the predetermined length of the display;

receiving touch input at the display at an initial touch point for displaying the elements in the first list;

displaying a portion of the second list starting at the initial touch point and the remainder of the portion of the second list displayed along the predetermined length from the initial touch point using the second spacing between elements of the second list, and displaying next to the portion of the second list a portion of the first list using the first spacing between elements of the first list;

sliding the touch point along the predetermined length to display further elements of the second list, wherein the elements of the second list are moved along the length of the display at a rate different than a motion of the touch point; and releasing the touch point to select an element in the second list and a corresponding element in the first list, wherein the selected elements are disposed elsewhere on the display from the touch point.

20. The method of claim 19 wherein the selectable elements in the second list are numbers and the selectable elements in the first list are one of channels and zones.

* * * * *